(12) United States Patent
Boling

(10) Patent No.: US 6,808,349 B1
(45) Date of Patent: Oct. 26, 2004

(54) FASTENER MECHANISM

(76) Inventor: David C. Boling, 5210 Long Prairie Rd., Apt. 52, Flower Mound, TX (US) 75028

( * ) Notice: Subject to any disclaimer, the term of this patent is extended or adjusted under 35 U.S.C. 154(b) by 0 days.

(21) Appl. No.: 10/654,027

(22) Filed: Sep. 4, 2003

(51) Int. Cl.[7] .............................. F16B 19/00; F16B 21/00
(52) U.S. Cl. ...................... 411/339; 411/354; 411/510; 403/313; 403/314
(58) Field of Search ................................ 411/338, 339, 411/354, 508, 509, 510; 403/299, 301, 302, 309, 310, 313, 314

(56) References Cited

U.S. PATENT DOCUMENTS

| | | | |
|---|---|---|---|
| 269,399 A | 12/1882 | Ensign | |
| 2,670,647 A | * 3/1954 | Jones | 417/339 X |
| 2,881,552 A | 4/1959 | Miller | |
| 3,337,682 A | 8/1967 | Sweet | |
| 4,118,838 A | 10/1978 | Schiefer et al. | |
| 4,328,605 A | 5/1982 | Hutchinson et al. | |
| 4,332,048 A | 6/1982 | Eddy | |
| 4,555,589 A | 11/1985 | Osada | |
| 4,684,498 A | * 8/1987 | Paul | 411/338 X |
| 4,761,860 A | * 8/1988 | Krauss | 411/339 X |
| 5,247,549 A | * 9/1993 | Cearley et al. | 411/508 X |
| 5,542,462 A | 8/1996 | Elsenheimer et al. | |
| 5,696,351 A | 12/1997 | Benn et al. | |
| 5,791,022 A | 8/1998 | Bohman | |
| D432,092 S | 10/2000 | Stebleton et al. | |

FOREIGN PATENT DOCUMENTS

EP 0 255 281 A3 2/1988

\* cited by examiner

*Primary Examiner*—Neill Wilson
(74) *Attorney, Agent, or Firm*—Locke Liddell & Sapp LLP

(57) ABSTRACT

A fastener mechanism operable between an unlocked position and a locked position to securely fasten items of various sizes and shapes includes a first member and a second member each having a sidewall, a front wall, a rear wall and a receiving chamber disposed adjacent the front wall of each member. The second member contains a hollow interior and is slightly larger than the first member so that the first member can be inserted inside the hollow interior. The receiving chambers extend axially along each member and contain an opening and angularly disposed sidewalls forming an apex. To securely fasten the item, the first member is co-axially aligned with the second member so that the receiving chamber openings are oriented to form an aperture to receive the item. The first member is then slideably inserted into the second member hollow interior. As the first member is inserted inside the second member, the aperture reduces in size to grip and securely fasten the item.

6 Claims, 1 Drawing Sheet

FASTENER MECHANISM

TECHNICAL FIELD OF THE INVENTION

The present invention relates to a fastener mechanism, more particularly, this invention relates to a fastener mechanism for securely fastening items of various sizes and shapes in fixed position with respect to the fastener.

BACKGROUND OF THE INVENTION

Devices used to securely fasten items are well known. However, many of these devices require tools operate, are difficult to use, and have a relatively large number of components. In addition, many fasteners are designed for specific items such as rope or wire and cannot secure differently shaped items, such as plastic trash bags, by way of example. More importantly, many of these fasteners are unable to adapt to items of different sizes (i.e., thick rope versus a thin rope). Thus, when it is necessary to secure different sized items, oftentimes a smaller or larger fastener must be purchased and used thus resulting in increased expense and inconvenience.

The present invention is designed to overcome these disadvantages by providing a fastener mechanism to allow users to securely fasten items of various sizes and shapes without the use of tools.

SUMMARY OF THE INVENTION

The present invention provides a fastener mechanism operable between an unlocked position and a locked position to securely fasten items of various sizes and shapes such as wire, rope, twine, fishing line and plastic trash bags. The fastener contains a first and second member each having a sidewall, a front wall, a rear wall and a receiving chamber disposed adjacent the front wall. The second member contains a hollow interior and is sized to receive the first member. The receiving chambers on the first and second members extend axially along each member and contain an opening and inwardly tapering sidewalls forming an apex opposite the opening. The receiving chamber apex is located a distance approximately halfway between the ends of the members.

In order to securely fasten an item using the fastener, the first member is co-axially aligned with the second member so that the receiving chamber openings are disposed adjacent each other. While in this position, the receiving chamber openings are oriented to form an aperture to receive the item. Once the item is placed in the aperture, the first member is slideably inserted into the second member hollow interior. As the first member is inserted inside the second member, the area of the aperture reduces in size due to the tapered sidewalls of the receiving chambers. As the aperture is reduced in size, the receiving chamber sidewalls enclose around and grip the item to securely fasten the item inside the aperture.

In order to prevent the first and second members from separating while in the locked position, the interior surface of the second member sidewall contains a detent protruding inside the hollow interior. The detent engages a slot, located on the outer surface of the sidewall, to frictionally lock the first and second members together while in the locked position.

BRIEF DESCRIPTION OF THE DRAWINGS

For a more complete understanding of the invention and for further advantages thereof, reference is no made to the following Description of the Preferred Embodiments taken in conjunction with the accompanying Drawings in which.

DESCRIPTION OF THE PREFERRED EMBODIMENTS

FIGS. 1–4 illustrate a fastener mechanism 10 having a first member 12 and a second member 14 to securely fasten an item 15, such as wire, rope, twine, fishing line and trash bags. Members 12 and 14 can be formed of any size or shape, such as cylindrical, square, or round and can be metal or plastic.

Figure 1:
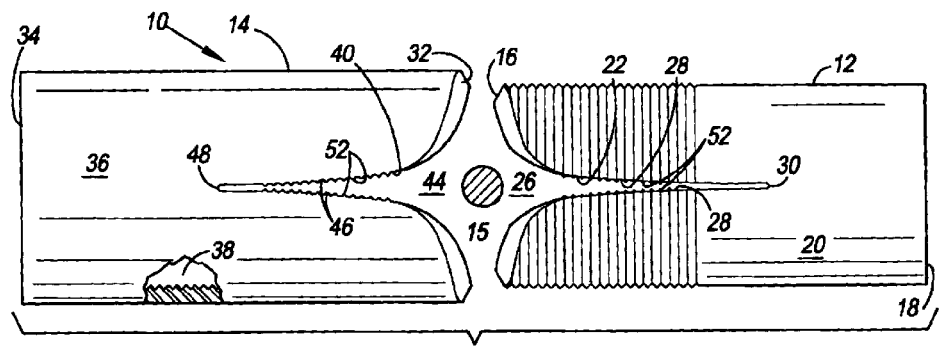
FIG. 1 is a side elevation view of the fastener mechanism in the unlocked position.
Figure 2:
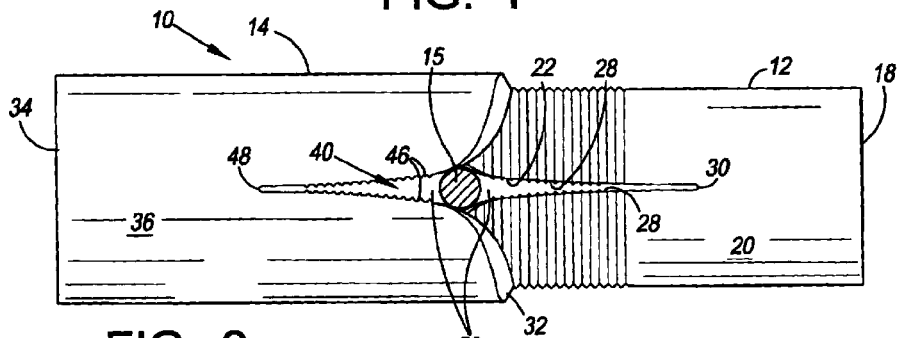
FIG. 2 is a side elevation view of the fastener mechanism with the first member being slideably inserted inside the second member.

As seen in FIG. 1, members 12 and 14 are separated so that fastener 10 is configured in the in the unlocked position. First member 12 contains a front wall 16, a rear wall 18 and a sidewall 20 extending between front and rear walls 16 and 18. A receiving chamber 22 is disposed adjacent front wall 16 and extends in a longitudinal direction towards a rear wall 18. Receiving chamber 22 includes an opening 26 and angularly disposed sidewalls 28 that extend toward rear wall 18 until reaching an apex 30, which is positioned approximately halfway between front and rear walls 16 and 18. Receiving chamber 22 extends though the width of first member 12.

Likewise, second member 14 contains a front wall 32, a rear wall 34 and a sidewall 36 extending between front and rear wall 32 and 34 to form a hollow interior 38. A receiving chamber 40 is disposed adjacent front wall 32 and extends in a longitudinal direction towards rear wall 34. Receiving chamber 40 contains an opening 44 and angularly disposed sidewalls 46 extending toward rear wall 34 until reaching an apex 48, which is positioned approximately halfway between front and rear walls 32 and 34. Receiving chamber 40 extends across the width of second member 14. Second member 14 is sized slightly larger than first member 12 such that the first member 12 can be inserted inside hollow interior 38 when fastening item 15.

In order to securely fasten item 15 with mechanism 10, members 12 and 14 are co-axially aligned with front walls 16 and 32 disposed adjacent and opposite each other (FIG. 1). While in this position, receiving chamber openings 26 and 44 and sidewalls 28 and 46 are oriented in alignment to form an aperture 50 (FIG. 2) to receive item 15. Once item 15 is inserted inside aperture 50, first member 12 is then slideably inserted into hollow interior 38 of second member 14. As first member 12 is inserted into second member 14, the size of aperture 50 is reduced and receiving chamber sidewalls 28 and 46 enclose and surround item 15. Receiving chamber sidewalls 28 and 46 retain item 15 to securely attach item 15 in fixed relation to mechanism 10. Receiving chambers 22 and 40 can optionally include ridges 52 to provide sufficient frictional engagement to grip item 15.

Figure 3:
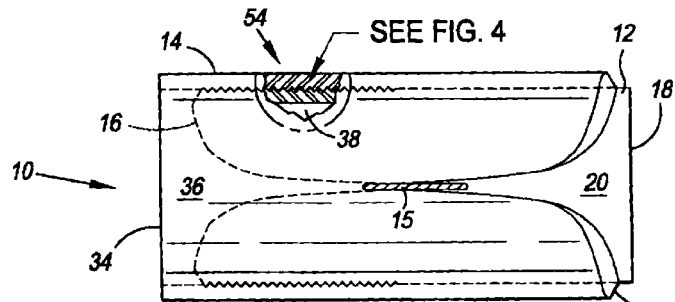
FIG. 3 is a side elevation view of the fastener mechanism in the locked position.
Figure 4:
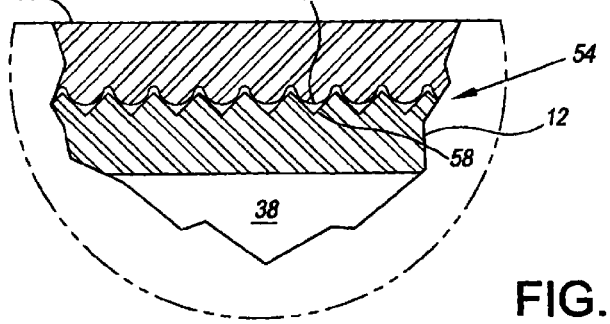
FIG. 4 is an enlarged view of the detent seen in FIG. 3.

FIGS. 3 and 4 illustrate mechanism 10 in the locked position. A lock 54 maintains first member 12 fixedly attached inside hollow interior 38. Lock 54 includes a detent 56 located along the interior surface of second member 14 to engage slots 58, disposed on the exterior surface of first member 12. Thus, when first member 12 is inserted inside second member 14 hollow interior 38, detent 56 frictionally engages slots 58 to prevent members 12 and 14 from separating. In order to separate members 12 and 14, the user can supply a sufficient force to overcome the detent force.

Fastener mechanism 10 can be attached to fixtures or devices, or used independently. Examples include attaching under kitchen cabinets or being mounted on a post to hold plastic bags while they are being filled. The present fastener can be mounted under counter tops or attached at the top of a tent stake to quickly adjust the hold line from the tent. A metallic version with an insulated coating can be used to attach two wires together without using a crimp tool. Further, a fishhook can be attached to a fishing line with a fastener instead of tying a knot by threading the fishing line through the hook and then using the fastener to adjoin the loose end of the fishing line to the fishing line coming from the fishing pole.

Although the preferred embodiments of the present invention have been illustrated in the accompanying drawings, and described in the foregoing Description of the Preferred Embodiments, it will be understood that the invention is not limited to the embodiments disclosed but is capable of numerous rearrangements, modifications, and substitutions of parts and elements without departing from the spirit of the invention.

I claim:

1. A fastener mechanism operable between an unlocked position and a locked position to securely fasten an item, the fastener mechanism comprising:

a first member having a front wall, a rear wall, a sidewall and a receiving chamber disposed adjacent said front wall;

said first member receiving chamber includes a pair of angularly disposed sidewalls forming an opening adjacent said first member front wall and forming an apex adjacent said first member rear wall;

a second member having a front wall, a rear wall, a sidewall and a receiving chamber disposed adjacent said front wall and having a hollow interior;

said second member receiving chamber includes a pair of angularly disposed sidewalls forming an opening adjacent said second member front wall and forming an apex adjacent said second member rear wall;

said first member receiving chamber sidewalls and said second member receiving chamber sidewalls includes ridges;

said first member adapted to be disposed within said hollow interior of said second member; and wherein when the fastener mechanism is in the unlocked position, said first member is detached from said second member and when the fastener mechanism is in the locked position, said first member is co-axially aligned with and disposed within said second member, said first member receiving chamber being disposed adjacent and opposite said second member receiving chamber to form an aperture therebetween for receiving the item, such that when said first member is slideably inserted into said second member, said aperture reduces in size to receive and grip the item.

2. The fastener mechanism of claim 1 wherein said first and second members are cylindrical.

3. A fastener mechanism operable between a locked position and an unlocked position, the fastener comprising:

a first member having a front wall, a rear wall, a sidewall extending between said front and rear walls, a receiving chamber disposed adjacent said front wall, said receiving chamber having a pair of angularly disposed sidewalls extending from an apex adjacent said rear wall toward said first member front wall forming a receiving chamber opening, a second member having a front wall, a rear wall, a sidewall extending between said front and rear walls, a receiving chamber disposed adjacent said front wall, said receiving chamber having a pair of angularly disposed sidewalls extending from an apex adjacent said rear wall toward said second member front wall forming a receiving chamber opening said second member having a hollow interior, said first member adapted to be disposed within said hollow interior of said second member; and wherein when the fastener mechanism is in the unlocked position, said first member is detached from said second member and when the fastener mechanism is in the locked position, said first member is co-axially aligned with and disposed within said second member, said first member receiving chamber opening being disposed adjacent and opposite said second member receiving chamber opening to form an aperture therebetween for receiving the item, such that when said first member is slideably inserted into said second member, said first member receiving chamber sidewalls and said second member receiving chamber sidewalls reduce the size of said aperture to receive and grip the item.

4. The fastener mechanism of claim 3 wherein said first and second member receiving chamber sidewalls include ridges.

5. The fastener mechanism of claim 4 wherein said first and second members are cylindrical.

6. A fastener mechanism operable between an unlocked position and a locked position to securely fasten an item, the fastener mechanism comprising:

a first member having a front wall, a rear wall, a sidewall and a receiving chamber disposed adjacent said front wall;

a second member having a front wall, a rear wall, a sidewall and a receiving chamber disposed adjacent said front wall and having a hollow interior;

said first member adapted to be disposed within said hollow interior of said second member;

wherein when the fastener mechanism is in the unlocked position, said first member is detached from said second member and when the fastener mechanism is in the locked position, said first member is co-axially aligned with and disposed within said second member, said first member receiving chamber being disposed adjacent and opposite said second member receiving chamber to form an aperture therebetween for receiving the item, such that when said first member is slideably inserted into said second member, said aperture reduces in size to receive and grip the item; and said second member sidewall contains a detent protruding inside said hollow interior and said first member sidewall contains a slot to receive said detent to lock said first member inside said second member.

* * * * *